United States Patent
Obrovac et al.

(10) Patent No.: US 10,038,187 B2
(45) Date of Patent: Jul. 31, 2018

(54) CATHODE COMPOSITIONS FOR SODIUM-ION BATTERIES AND METHODS OF MAKING SAME

(71) Applicant: 3M INNOVATIVE PROPERTIES COMPANY, St. Paul, MN (US)

(72) Inventors: Mark N Obrovac, Nova Scotia (CA); Timothy D Hatchard, Nova Scotia (CA); Douglas S Iaboni, Nova Scotia (CA)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 199 days.

(21) Appl. No.: 14/781,738

(22) PCT Filed: Mar. 27, 2014

(86) PCT No.: PCT/US2014/031949
§ 371 (c)(1),
(2) Date: Oct. 1, 2015

(87) PCT Pub. No.: WO2014/165378
PCT Pub. Date: Oct. 9, 2014

(65) Prior Publication Data
US 2016/0049653 A1 Feb. 18, 2016

Related U.S. Application Data

(60) Provisional application No. 61/808,444, filed on Apr. 4, 2013.

(51) Int. Cl.
*H01M 4/485* (2010.01)
*H01M 10/054* (2010.01)
(Continued)

(52) U.S. Cl.
CPC .......... *H01M 4/485* (2013.01); *C01G 37/006* (2013.01); *C01G 37/14* (2013.01); *C01G 39/006* (2013.01);
(Continued)

(58) Field of Classification Search
CPC ...... H01M 4/485; H01M 4/48; H01M 10/054; C01G 37/006; C01G 37/14; C01G 45/006
See application file for complete search history.

(56) References Cited

U.S. PATENT DOCUMENTS

2002/0055040 A1 5/2002 Mukherjee
2002/0192553 A1 12/2002 Barker
(Continued)

FOREIGN PATENT DOCUMENTS

EP 0672622 9/1995

OTHER PUBLICATIONS

Komaba, "Electrochemically Reversible Sodium Intercalation of Layered NaNi$_{0.5}$Mn$_{0.5}$O$_2$ and NaCrO$_2$," ECS Transactions, 2009, vol. 16 No. 42, pp. 43-55.
(Continued)

*Primary Examiner* — Kenneth J Douyette
(74) *Attorney, Agent, or Firm* — Adam Bramwell

(57) ABSTRACT

A cathode composition for a sodium-ion battery. The cathode composition may have the formula NaCr$_{1-x}$M$_x$O$_2$, where M is one or more metal elements, and x is greater than 0 and less than or equal to 0.5.

9 Claims, 17 Drawing Sheets

(51) Int. Cl.
    *C01G 37/14*     (2006.01)
    *C01G 45/12*     (2006.01)
    *C01G 37/00*     (2006.01)
    *C01G 45/00*     (2006.01)
    *C01G 39/00*     (2006.01)
    *C01G 41/00*     (2006.01)
    *C01G 51/00*     (2006.01)
    *C01G 53/00*     (2006.01)

(52) U.S. Cl.
    CPC ......... *C01G 41/006* (2013.01); *C01G 45/006* (2013.01); *C01G 45/1228* (2013.01); *C01G 51/42* (2013.01); *C01G 53/42* (2013.01); *H01M 10/054* (2013.01); *C01P 2002/54* (2013.01); *C01P 2002/72* (2013.01); *C01P 2006/40* (2013.01); *H01M 2220/20* (2013.01); *H01M 2220/30* (2013.01)

(56) References Cited

U.S. PATENT DOCUMENTS

| | | | |
|---|---|---|---|
| 2007/0072034 A1* | 3/2007 | Barker | H01M 4/131 |
| | | | 429/122 |
| 2010/0248041 A1 | 9/2010 | Kikuchi | |
| 2012/0015256 A1 | 1/2012 | Komaba | |
| 2012/0208092 A1 | 8/2012 | Ku | |
| 2015/0295279 A1 | 10/2015 | Numata et al. | |

OTHER PUBLICATIONS

Komba, "Electrochemical intercalation activity of layered $NaCrO_2$ vs. $LiCrO_2$," Electrochemistry Communications, 2010, vol. 12, pp. 355-358.

Stevens, "The Mechanisms of Lithium and Sodium Insertion in Carbon Materials", Journal of The Electrochemical Society, 2001, vol. 148, No. 8, pp. A803-A811.

Tran, "Alloy Negative Electrodes for High Energy Density Metal-Ion Cells", Journal of The Electrochemical Society, 2011, vol. 158, No. 12, pp. A1411-A1416.

International Search Report for PCT International Application No. PCT/US2014/31949, dated Sep. 2, 2014, 3pgs.

Xin Xia et al: "NaCr02 is a Fundamentally Safe Positive Electrode Material for Sodium-Ion Batteries with Liquid Electrolytes", Electrochemical and Solid-State Letters., vol. 15, No. 1, Jan. 1, 2012 (Jan. 1, 2012 ), p. A 1, XP055316286, US, ISSN: 1 099-0062, DOI: 10.1149/2.002201 esl.

A Olariu et al: "NMR and 1-JSR study of magnetic dilution in the triangular Heisenberg antiferromagnet NaCr02", Journal of Physics: Conference Series, vol. 145, Jan. 1, 2009 (Jan. 1, 2009 ), p. 012042, XP055316258, GB, ISSN: 17 42-6588, DOI: 10.1 088/17 42-6596/ 145/1/012042.

* cited by examiner

CATHODE COMPOSITIONS FOR SODIUM-ION BATTERIES AND METHODS OF MAKING SAME

CROSS REFERENCE TO RELATED APPLICATIONS

This application is a national stage filing under 35 U.S.C. 371 of PCT/US2014/031949, filed Mar. 27, 2014, which claims priority to U.S. Application No. 61/808,444, filed Apr. 4, 2013, the disclosure of which is incorporated by reference in its/their entirety herein.

FIELD

The present disclosure relates to compositions useful as cathodes for sodium-ion batteries and methods for preparing and using the same.

BACKGROUND

Various cathode compositions have been introduced for use in secondary sodium-ion batteries. Such compositions are described, for example, in S. Komaba, et. al., *ECS Trans.*, 16(42), 43-55 (2009); and S. Komaba, et. al., *Electrochemistry Communications*, 12, 355-358 (2010).

SUMMARY

In some embodiments, a cathode composition for a sodium-ion battery is provided. The cathode composition may have the formula $NaCr_{1-x}M_xO_2$, where M is one or more metal element, and x is greater than 0 and less than or equal to 0.5.

In some embodiments, a sodium-ion electrochemical cell is provided. The electrochemical cell includes a cathode, an anode, and an electrolyte. The cathode may include a composition having the formula $NaCr_{1-x}M_xO_2$, where M is one or more metal element, and x is greater than 0 and less than or equal to 0.5.

In some embodiments, a method of making a cathode composition is provided. The method includes combining precursors of a composition having the formula: $NaCr_{1-x}M_xO_2$. The method further includes heating the precursors to form the composition. M is one or more metal elements, and x is greater than 0 and less than or equal to 0.5.

The above summary of the present disclosure is not intended to describe each embodiment of the present invention. The details of one or more embodiments of the disclosure are also set forth in the description below. Other features, objects, and advantages of the invention will be apparent from the description and from the claims.

BRIEF DESCRIPTION OF THE DRAWINGS

The disclosure may be more completely understood in consideration of the following detailed description of various embodiments of the disclosure in connection with the accompanying figures, in which.

DETAILED DESCRIPTION

Figure 1:
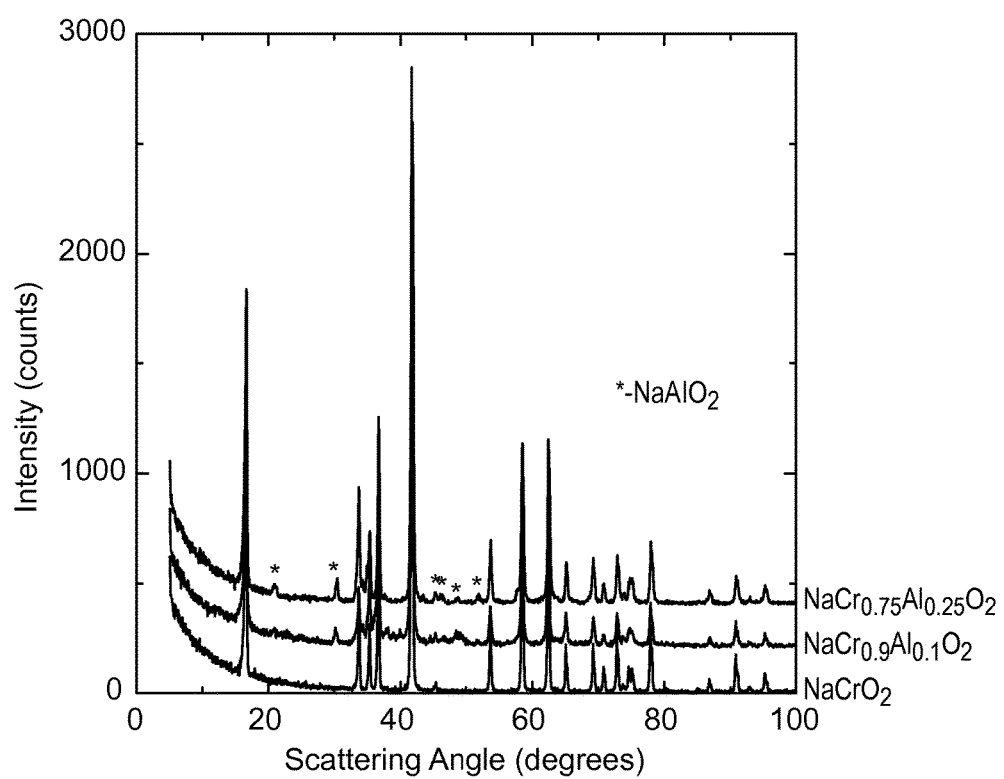
FIG. 1 shows XRD patterns for Comparative Examples 1 and Examples 2 and 3.

Sodium (Na)-ion batteries are of interest as a low cost, high energy density battery chemistry. $NaCrO_2$ is a structural analog for $LiCoO_2$, a widely used cathode material in Li-ion batteries. $NaCrO_2$ has been shown to be electrochemically active for Na-ion cells and have high thermal stability. $NaCrO_2$, especially when heated at 900° C. for long periods of time has rapid decay of cell performance. This effect may be caused by an increase in grain size during the heating step. This limits the amount of sodium that can be removed from the material, and therefore effectively decreases the available capacity. Consequently, increasing cycle life and high voltage tolerance may make $NaCrO_2$ an attractive cathode for commercial Na-ion cells.

Sodium metal has a lower cost and is more easily obtained than lithium, making Na-ion cells a potentially less expensive option than their Li-ion counterparts. Further, the high thermal stability of $NaCrO_2$ makes it an excellent candidate for use in applications for which thermal stability is a significant consideration (e.g., automotive applications). Improvements in cycle life and capacity to $NaCrO_2$ may facilitate Na-ion technologies becoming competitive with Li-ion technologies.

Definitions

In this document:

the terms "sodiate" and "sodiation" refer to a process for adding sodium to an electrode material;

the terms "desodiate" and "desodiation" refer to a process for removing sodium from an electrode material;

the terms "charge" and "charging" refer to a process for providing electrochemical energy to a cell;

the terms "discharge" and "discharging" refer to a process for removing electrochemical energy from a cell, e.g., when using the cell to perform desired work;

the phrase "positive electrode" refers to an electrode (often called a cathode) where electrochemical reduction and sodiation occurs during a discharging process; and the phrase "negative electrode" refers to an electrode (often called an anode) where electrochemical oxidation and desodiation occurs during a discharging process.

As used herein, the singular forms "a", "an", and "the" include plural referents unless the content clearly dictates otherwise. As used in this specification and the appended embodiments, the term "or" is generally employed in its sense including "and/or" unless the content clearly dictates otherwise.

As used herein, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

In some embodiments, the present disclosure relates to cathode compositions for Na-ion batteries. Generally, the cathode compositions may include $NaCrO_2$ and one or more dopants. As used herein, the term "dopants" refers to additives that can be incorporated in the $NaCrO_2$ structure (e.g., substituted for at least a portion of the chromium), and to additives that cannot be incorporated in the structure. Applicant has discovered that substituting some of the chromium in $NaCrO_2$ with one or more dopants can be readily achieved by adding some of an appropriate oxide to the precursor material before a heating step. Additionally, Applicant has discovered that some dopants are not incorporated in the $NaCrO_2$ structure, but may modify the grain morphology of the $NaCrO_2$ phase and significantly improve its electrochemical performance.

In some embodiments, the cathode compositions may contain one or more additional materials, or dopants, M according the formula:

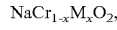
$NaCr_{1-x}M_xO_2$, where M is one or more metal elements, and where x is at least 0.02, at least 0.1, at least 0.2, or at least 0.3; x is less than 0.4, x is less than 0.2 or x is less than 0.1; or x is 0.02 to 0.1 or 0.1 to 0.5, or 0.2 to 0.4. The provided cathode compositions can exhibit improved electrochemical cycling performance and higher capacities compared to $NaCrO_2$, when incorporated into Na-ion electrochemical cells. The dopant(s), in some embodiments, can be selected from transition metals, Group 13 elements of the periodic table, and combinations thereof. In another embodiment, the dopant(s) can be selected from transition metals, aluminum, and combinations thereof. In some embodiments, the transition metal can be selected from titanium, vanadium, chromium, manganese, cobalt, nickel, copper, zirconium, niobium, molybdenum, tungsten, and combinations thereof. In yet another embodiment, the dopant(s) can be selected from aluminum, titanium, manganese, vanadium, and combinations thereof. In one embodiment, the dopant(s) may consist essentially of one or more of titanium, aluminum, manganese, vanadium, and combinations thereof.

In illustrative embodiments, specific examples of cathode compositions may include those having the formulae $NaCr_{0.9}Al_{0.1}O_2$, $NaCr_{0.85}V_{0.15}O_2$, and $NaCr_{0.7}Mn_{0.3}O_2$.

In some embodiments, the cathode compositions may be single phase, having an $\alpha$-$NaFeO_2$ type crystal structure. In other embodiments the cathode compositions may predominantly include a single phase with an $\alpha$-$NaFeO_2$ type crystal structure, but also can include a secondary phase consisting of a metal oxide or a sodium transition metal oxide. Examples of such secondary phases include, without limitation, $NaAlO_2$ or $MnO$.

In some embodiments, the $NaCrO_2$ cathode materials of the present disclosure may be single phase (as evidenced by their respective XRD patterns) (e.g., $NaCr_{0.9}Fe_{0.1}O_2$, $NaCr_{0.9}Ti_{0.1}O_2$, $NaCr_{0.9}Mn_{0.1}O_2$, $NaCr_{0.9}V_{0.1}O_2$, $NaCr_{0.85}V_{0.15}O_2$), indicating that a dopant is incorporated into the $NaCrO_2$ structure. In various embodiments, the $NaCrO_2$ cathode materials of the present disclosure include two phases (as evidenced by their respective XRD patterns) (e.g., $NaCr_{0.9}Al_{0.1}O_2$, $NaCr_{0.75}Al_{0.25}O_2$, $NaCr_{0.8}Mn_{0.2}O_2$, $NaCr_{0.7}Mn_{0.3}O_2$), indicating that some or all of the dopants are present in the second phase and that a dopant may or may not be incorporated into the $NaCrO_2$ structure. In each of the aforementioned embodiments, the addition of a dopant may cause a reduction in the grain size of the O3 phase, compared to undoped $NaCrO2$.

In various embodiments, the amount of sodium in the composition can vary depending upon the charged and discharged states of the cathode when incorporated into a sodium-ion battery. Sodium can move from and to the cathode to the anode during charging and discharging. After sodium has moved from the cathode to the anode for the first time, some of the sodium originally in the cathode material can remain in the anode. This sodium (measured as irreversible capacity) is usually not returned to the cathode and is usually not useful for further charging and discharging of the battery. During subsequent charging and discharging cycles it is possible that more sodium becomes unavailable for cycling.

In some embodiments, the doped $NaCrO_2$ cathode materials of the present disclosure react reversibly with Na when incorporated in Na half-cells. In some embodiments, electrochemical cells incorporating the doped $NaCrO_2$ cathode materials of the present disclosure were found to cycle better than $NaCrO_2$ under similar cycling conditions. Furthermore, in some embodiments, electrochemical cells were found to have low voltage hysteresis. These improvements in cycle life were found to be accompanied by differences in the differential capacity of sodium half cells of doped materials compared to undoped $NaCrO_2$. While not intended to be bound by theory, it is believed that this may indicate that some of the dopants are being incorporated into the $NaCrO_2$ structure. While not intended to be bound by theory, it is also believed that the improvement in cycle life may be a consequence of differences in grain size between undoped and doped materials.

In some embodiments, to form a cathode from the provided cathode compositions, additives such as binders (e.g., polyvinylidene fluoride (PVDF) or styrene butadiene rubber (SBR)), conductive diluents (e.g., carbon blacks or carbon nanotubes), fillers (e.g., graphitic carbon, adhesion promoters, thickening agents for coating viscosity modification such as carboxymethylcellulose) and other additives known by those skilled in the art can be mixed in a suitable coating solvent (e.g., water or N-methylpyrrolidinone (NMP)) to form a coating dispersion or coating mixture. The coating dispersion or coating mixture can be mixed thoroughly and then applied to a current collector by any appropriate coating technique such as reverse roll coating, knife coating, notched bar coating, dip coating, spray coating, electrospray coating, or gravure coating. The current collectors can be foils of conductive metals such as, for example, copper, aluminum, stainless steel, or nickel foil. The slurry can be coated onto the current collector foil and then allowed to dry in air followed usually by drying in a heated oven, typically at about 80° C. to about 300° C. for about an hour to remove the solvent. The resulting cathodes may then be compressed to increase their density.

In various embodiments, the provided cathode compositions can also include an electrically conductive diluent to facilitate electron transfer from the powdered cathode composition to a current collector. Electrically conductive diluents include, but are not limited to, carbon (e.g., carbon black), metal, metal nitrides, metal carbides, metal silicides, and metal borides. Representative electrically conductive carbon diluents include carbon blacks such as SUPER P carbon black (both from Timcal Ltd., Bodio Switzerland), SHAWANIGAN BLACK (Chevron Chemical Co., Houston, Tex.), Ketjen Black (AkzoNobel Functional Chemicals, Chicago, U.S.A.) acetylene black, furnace black, lamp black, graphite, carbon fibers and combinations thereof.

The present disclosure further relates to methods of making the above-described cathode compositions. In various embodiments, the cathode compositions can be synthesized by any suitable method, e.g., by ball milling or jet milling to combine precursors of the metal elements (e.g., oxides, hydroxides, nitrates, and the like), followed by heating to generate the cathode composition. Heating may be conducted in inert gas at a maximum temperature of at least 600° C. or at least 800° C. or at least 900° C. or at least 1000° C. Suitable inert gases include argon and nitrogen. In some embodiments, the method of making the provided cathode compositions can include co-precipitation of soluble precursors of the desired composition by taking stoichiometric amount of water-soluble salts of the metals desired in the final composition (excepting sodium and oxygen) and dissolving them in an aqueous mixture. As examples, sulfate, nitrates, and halide salts can be utilized. Exemplary sulfate salts useful as precursors to the provide compositions include sulfates, such as aluminum sulfate or transition metal sulfates, including chromium sulfate, vanadium sulfate or manganese sulfate. The aqueous mixture can then made basic (to a pH greater than about 9) by the addition of ammonium hydroxide or another suitable base as will be known by those of ordinary skill in the art. The metal hydroxides, which are not soluble at high pH, precipitate out, can be filtered, washed, and dried thoroughly to form a blend. To this blend can be added sodium carbonate, sodium hydroxide, sodium peroxide, or a combination form a mixture. In some embodiments, the mixture can be sintered by heating it in an inert gas to a temperature above 600° C. for a period from between 1 and 10 hours. The mixture can then be heated above about 1000° C. for an additional period of time until a stable composition is formed.

In some embodiments, the provided cathode compositions can have high specific capacity (mAh/g) retention when incorporated into a sodium ion battery and cycled through multiple charge/discharge cycles. For example, the provided cathode compositions can have a specific capacity of greater than 70 mAh/g, greater than 80 mAh/g, greater than 90 mAh/g, or even greater than 100 mAh/g after 10, or even more charging and discharging cycles at rates of C/10 when the battery is cycled between 2.2 and 3.6 V vs. Na and the temperature is maintained at about room temperature (25° C.).

In illustrative embodiments, the cathode compositions can be combined with an anode and an electrolyte to form a Na-ion battery. Examples of suitable anodes include carbonaceous materials. Examplary carbonaceous materials include soft carbons (carbonaceous materials that can graphitize when heated under atmospheric pressure), hard carbons (carbonaceous materials that cannot graphitize when heated under atmospheric pressure) and hydrogen containing carbons (carbonaceous materials made from organic precursors heated at temperatures near 700° C.). Examples of suitable carbonaceous materials are described in D. A Stevens and J. R. Dahn, J. Electrochem. Soc. 148 (2001) A803. Examples of suitable anodes also include metals which can alloy with Na (active metals, such as tin and lead) and alloys of active metals with metals that cannot alloy with Na (inactive metals, such as iron). Examples of such alloys are described in Tuan T. Tran and M. N. Obrovac, J. Electrochem. Soc. 158 (2011) A1411.

In some embodiments, provided electrochemical cells can contain an electrolyte. Representative electrolytes can be in the form of a solid, liquid or gel. Exemplary solid electrolytes include polymeric media such as polyethylene oxide, polytetrafluoroethylene, polyvinylidene fluoride, fluorine-containing copolymers, polyacrylonitrile, combinations thereof and other solid media that will be familiar to those skilled in the art. Examples of liquid electrolytes include organic carbonates, such as ethylene carbonate, propylene carbonate, dimethyl carbonate, diethyl carbonate, ethylmethyl carbonate, butylene carbonate, vinylene carbonate, and fluoroethylene carbonate. The electrolyte can be provided with a sodium electrolyte salt. Exemplary sodium salts include $NaPF_6$, $NaClO_4$, $NaN(CF_3SO_2)_2$, $NaN(C_2F_5SO_2)_2$, $NaAsF_6$, and combinations thereof. In some embodiments, sodium-ion electrochemical cells that include the provided cathode compositions can be made by taking a positive electrode and a negative electrode as described above and placing them in an electrolyte. Typically, a microporous separator, such as microporous material available from Celgard LLC, Charlotte, N.C., is used to prevent the contact of the negative electrode directly with the positive electrode.

The disclosed electrochemical cells can be used in a variety of devices including, without limitation, portable computers, tablet displays, personal digital assistants, mobile telephones, motorized devices (e.g., personal or household appliances and vehicles), instruments, illumination devices (e.g., flashlights) and heating devices. One or more electrochemical cells of this invention can be combined to provide a battery pack.

The operation of the present disclosure will be further described with regard to the following detailed examples. These examples are offered to further illustrate various specific embodiments and techniques. It should be understood, however, that many variations and modifications may be made while remaining within the scope of the present disclosure.

EXAMPLES

Preparation of $NaCr_{1-x}M_xO_2$

Stoichiometric amounts of $Cr_2O_3$ (Sigma Aldrich, 98%) and an oxide of the dopant element (for example $Al_2O_3$ (Sigma Aldrich, 99.9%), $TiO_2$ (Sigma Aldrich, 99%) or $Fe_2O_3$ (Sigma Aldrich, 99%), $Mn_2O_3$ (Sigma Aldrich, 99%), $V_2O_3$ (Sigma Aldrich, 98%) were weighed and placed in a hardened steel ball mill vial (Retsch) with two 7/16" hardened steel balls. The vial was placed in an Ar filled glove box. $Na_2O$ (Aldrich, 80%) was added to the vial with ~10% more than the stoichiometric amount being used. The vial was then sealed in the Ar filled glove box. The vial was removed from the glove box and placed in a Retsch PM 200 planetary mill for a period of 2 hours at a speed of 200 rpm. The vial was then placed back in the Ar filled glove box, the sample was removed and placed in an alumina boat. The boat with the sample was placed in a quartz tube, along with a second boat containing Ti sponge. The Ti sponge is placed so it will be upstream of gas (Ar) to be flowed through the tube during heating and act as an oxygen getter to ensure an $O_2$-free atmosphere. The quartz tube was sealed with end caps fitted with ball valves and quick-connect couplings and then removed from the glove box. The quartz tube containing the sample and the Ti sponge was then placed in a furnace and gas lines were connected. Ar was flowed continuously through the tube during the heating step. The furnace was heated to 900° C. at 10° C. per minute and then held at 900° C. for 12 hours. The furnace was then allowed to cool to room temperature. The gas flow was halted and the sample was removed from the tube for x-ray diffraction (XRD) measurement.

$NaCr_{1-x}M_xO_2$ Electrode Preparation 1.2 g of active material, 0.15 g of Super P carbon black (MMM Carbon, Belgium) and 0.15 g of PVDF (Kynar, HSV900) were weighed into a hardened steel ball mill vial. Two 0.5" tungsten carbide balls were added along with 3-3.5 g of N-methylpyrrolidone (Sigma Aldrich, 99.5% anhydrous). The slurry was mixed for two hours at 200 rpm in a Retsch PM 200 planetary mill. The slurry was then coated onto aluminum foil using a doctor blade with a 0.008" gap. The coating was dried at 120° C. overnight in air prior to use. Electrode disks 12.95 mm in diameter were punched from the foil for use in coin cells. Each disk had approximately 8-12 mg of $NaCr_{1-x}M_xO_2$ active material.

Electrolyte and Coin Cell Preparation

All electrolyte and coin cell preparation was performed in an argon filled glovebox with less than 0.1 ppm moisture and oxygen. Electrolytes were prepared by dissolving $NaPF_6$ (98% Sigma-Aldrich) salt in propylene carbonate (Novolyte). Coin cells were constructed from 2325 coin cell hardware. Na electrodes were prepared by punching 15.60 mm disks from ~250 μm Na foil that had been rolled from Na chunks (ACS reagent grade, Sigma-Aldrich). Each cell contained a Na foil electrode, Celgard 3501 separator and a blown polypropylene microfiber separator, electrolyte, a $NaCr_{1-x}M_xO_2$ disk electrode, and a stainless steel spring and spacer.

Electrochemical Measurements

All coin cells were electrochemically cycled at a rate of C/10, based on 120 mAh/g for $NaCr_{1-z}M_zO_2$ using a Maccor Series 4000 Battery Test System. Cycling tests were performed in a thermostatically controlled chamber (±0.5° C.) at 30° C. The fade rate of cells was measured as the capacity loss between cycle 3 and cycle 10. The voltage hysteresis was determined as the average voltage during the second discharge half cycle subtracted from the average voltage during the second charge half cycle.

XRD Analysis

XRD patterns were measured using a diffractometer equipped with a Cu-target X-ray tube and a diffracted beam monochromater. The peak width of samples was calculated using the Scherrer equation from the full width at half maximum of the 104 peak of the O3 phase, which occurs at about 42° two theta scattering angle in the diffraction pattern.

Comparative Example 1

Figure 2:
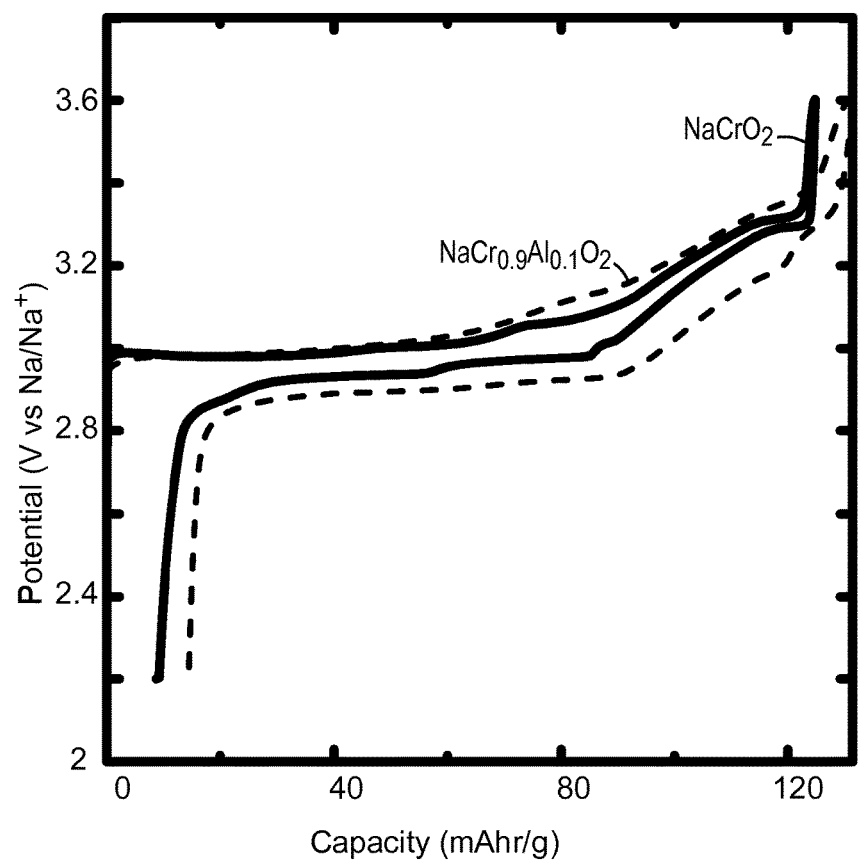
FIG. 2 shows the voltage curves of the cells of Comparative Example 1 and of Example 1.
Figure 3:
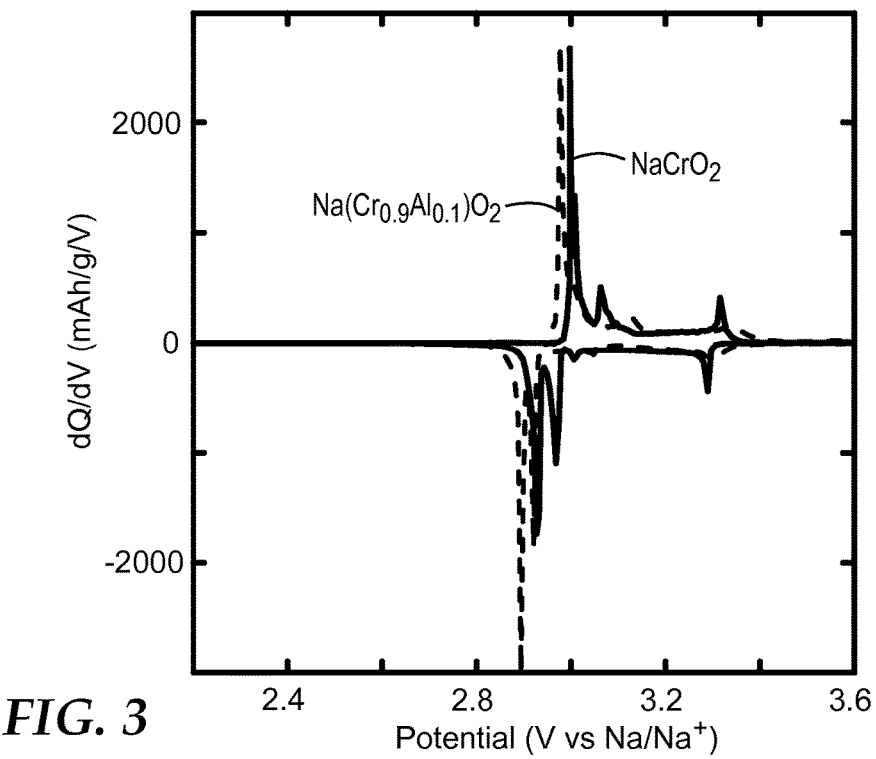
FIG. 3 shows the differential capacity curves of the cells of Comparative Example 1 and of Example 1.
Figure 4:
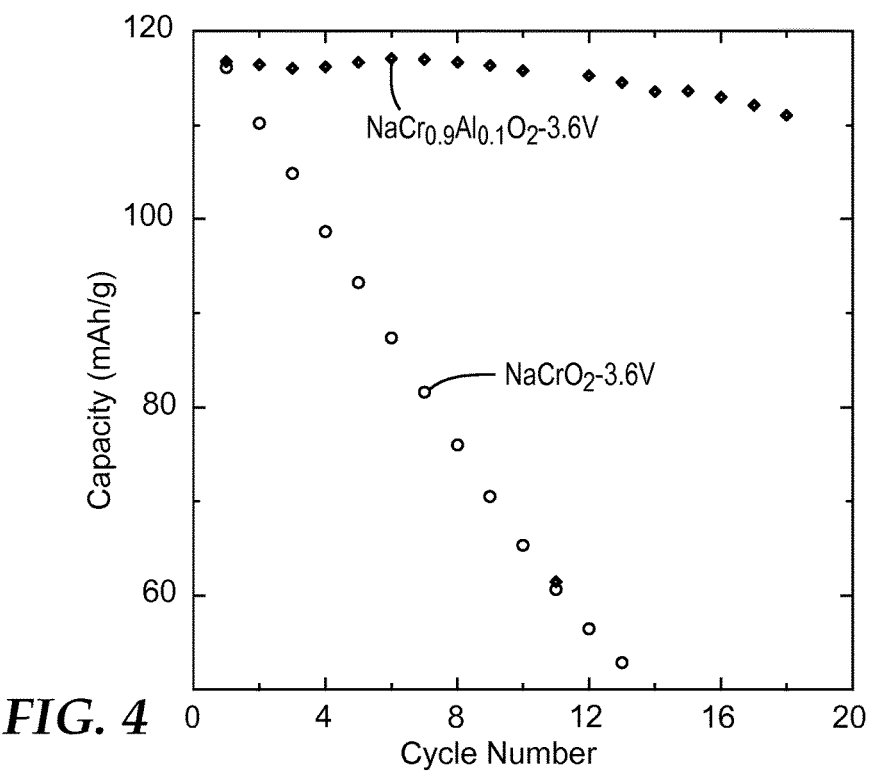
FIG. 4 shows the capacity versus the cycle number of the cell of Comparative Example 1 and of Example 1.

$NaCrO_2$ powder was prepared using $Cr_2O_3$ and $Na_2O$ precursor oxides. The XRD pattern of this powder is shown in FIG. 1, which shows that a single-phase crystalline oxide with the O3 structure was produced with a grain size of about 42.5 nm. From this powder $NaCrO_2$ vs Na coin cells were constructed. One cell was cycled at a rate of C/10 between 2.2-3.6 V vs Na. The voltage curve for the first cycle of this cell is shown in FIG. 2 and the differential capacity curve is shown in FIG. 3. The capacity of the cell faded rapidly with cycle number, as shown in FIG. 4, having a fade rate of 27 mAh/g.

Comparative Example 2

Figure 5:
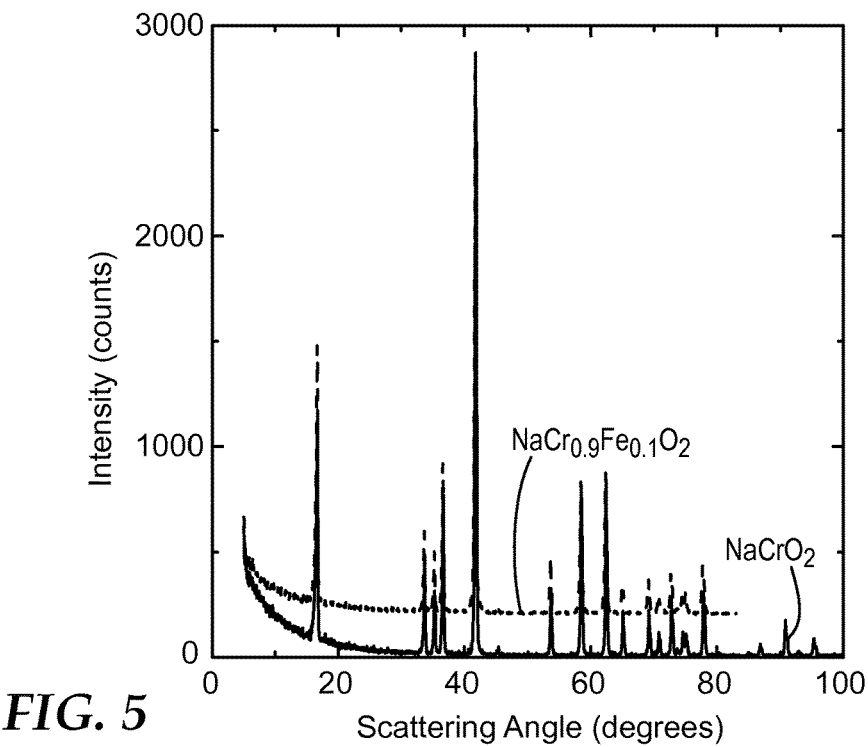
FIG. 5 shows XRD patterns for Comparative Examples 1 and 2.
Figure 6:
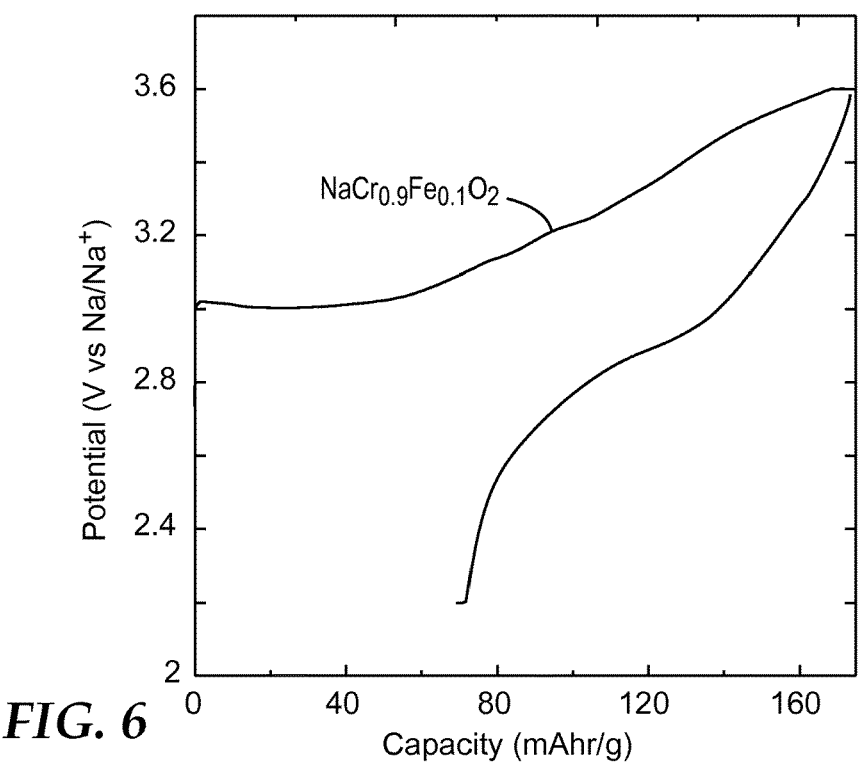
FIG. 6 shows the voltage curve of the cell of Comparative Example 2.
Figure 7:
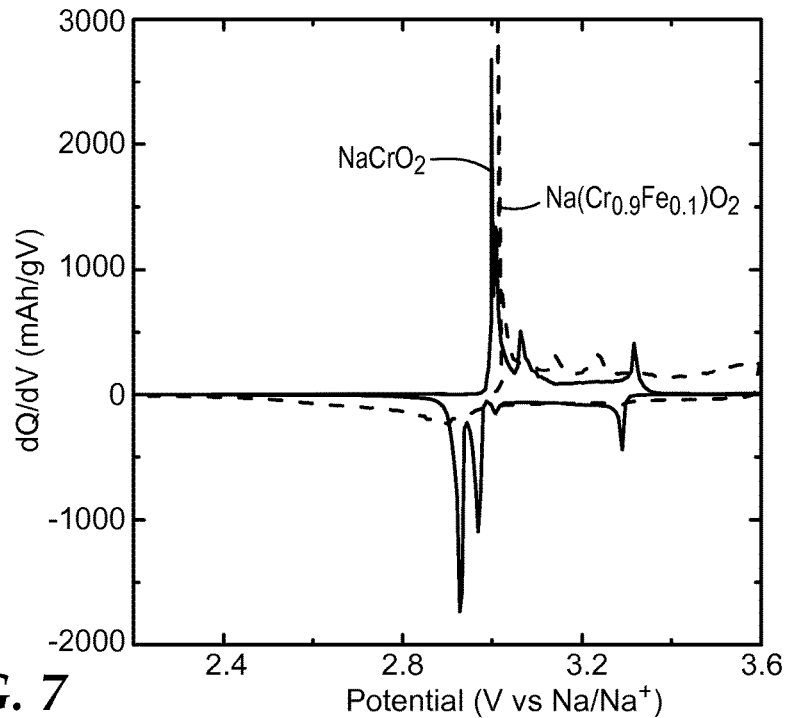
FIG. 7 shows the differential capacity curves of the cells of Comparative Example 1 and Example 2.

$NaCr_{0.9}Fe_{0.1}O_2$ powder was prepared using $Cr_2O_3$, $Fe_2O_3$ and $Na_2O$ precursor oxides. The XRD pattern of this powder is shown in FIG. 5. Only peaks that are indicative of a crystalline oxide phase with the O3 structure are present in the diffraction pattern. This indicates that the material synthesized is likely a single phase with the chemical formula $NaCr_{0.9}Fe_{0.1}O_2$. The grain size of this phase was determined to be 29.3 nm by XRD. From this powder $NaCr_{0.9}Fe_{0.1}O_2$ vs Na coin cells were constructed. One cell was cycled at a rate of C/10 2.2-3.6 V vs Na. The voltage curve for this cell is shown in FIG. 6 and the differential capacity is shown in FIG. 7. There are significant differences between the differential capacity of this material and the $NaCrO_2$ cell from Comparative Example 1. The sharp features for the undoped sample are smoothed out for the doped sample and the potential of some peaks have changed. This may indicate that the material in Comparative Example 2 is structurally different than the material in Comparative Example 1, including, for instance, the inclusion of Fe in the Cr layer of $NaCrO_2$. The hysteresis of the cell is also much larger than that of Comparative Example 1, which is an undesirable property. This may indicate structural instability during electrochemical cycling. This cell faded rapidly with cycle number, having a fade rate of 16 mAh/g.

Example 1

$NaCr_{0.9}Al_{0.1}O_2$ powder was prepared using $Cr_2O_3$, $Al_2O_3$ and $Na_2O$ precursor oxides. The XRD pattern of this powder is shown in FIG. 1 and shows that two phases are present. A peak at about 30° in the diffraction pattern is indicative that $NaAlO_2$ phase is present in this sample. The other peaks in the diffraction pattern are indicative of a crystalline oxide phase with the O3 structure. This phase may be $NaCrO_2$ or $NaCrO_2$ with some incorporated aluminum (e.g. $NaCr_{1-x}Al_xO_2$). The grain size of the O3 phase was determined to be 31.5 nm by XRD. From this powder $NaCr_{0.9}Al_{0.1}O_2$ vs Na coin cells were constructed. One cell was cycled at a rate of C/10 between 2.2-3.6 V vs Na. The voltage curve for this cell is shown in FIG. 2 and the differential capacity is shown in FIG. 3. There are significant differences between the differential capacity plots of this material and the cells from Comparative Example 1 and Comparative Example 2. The peaks in the differential capacity occur at different voltages and have different peak widths. This may indicate that the material in Example 1 is structurally different than the materials in Comparative Example 1 and Comparative Example 2, including, for instance, the inclusion of aluminum in the Cr layer of $NaCrO_2$. The differences in electrochemical characteristics may also be a consequence of differences in grain size. The capacity versus cycle number of the $NaCr_{0.9}Al_{0.1}O_2$ vs Na coin cell is shown in FIG. 4. The cell had higher capacity and improved capacity retention compared to that of Comparative Example 1 or Comparative Example 2. The cell also had a significantly lower voltage hysteresis of 150 mV compared to Comparative Example 2.

Example 2

Figure 8:
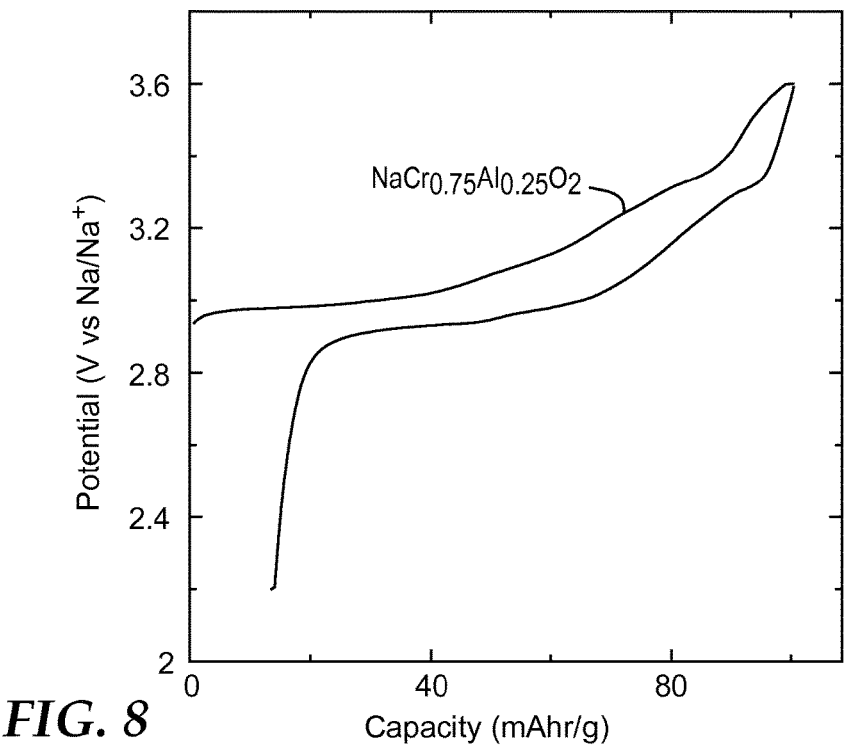
FIG. 8 shows the voltage curve of the cell of Example 2.
Figure 9:
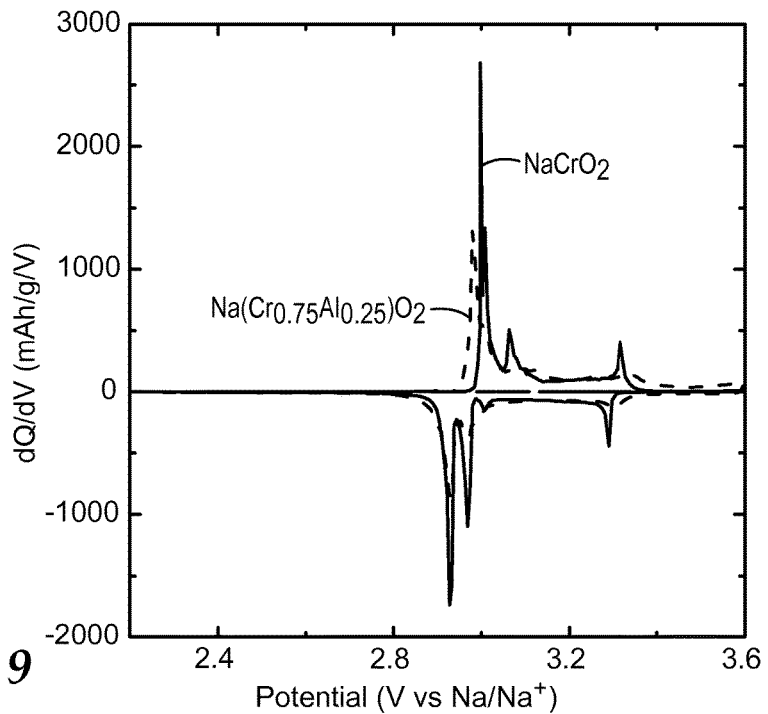
FIG. 9 shows the differential capacity curves of the cells of Comparative Example 1 and of Example 2.

$NaCr_{0.75}Al_{0.25}O_2$ powder was prepared and incorporated into electrochemical cells by the same method as described in Example 1. The XRD pattern of this powder is shown in FIG. 1, which contains peaks from a crystalline oxide with the O3 structure and peaks from a $NaAlO_2$ phase. The O3 phase may be $NaCrO_2$ or $NaCrO_2$ with some incorporated aluminum (e.g. $NaCr_{1-x}Al_xO_2$). The grain size of the O3 phase was determined to be 27 nm by XRD. From this powder $NaCr_{0.75}Al_{0.25}O_2$ vs Na coin cells were constructed. One cell was cycled at a rate of C/10 between 2.2-3.6 V vs Na. The voltage curve for this cell is shown in FIG. 8 and the differential capacity is shown in FIG. 9. There are significant differences between the differential capacity plots of this material and the cells from Comparative Example 1 and Comparative Example 2. The peaks in the differential capacity occur at different voltages and have different peak widths. This may indicate that the material in Example 2 is structurally different than the materials in Comparative Example 1 and Comparative Example 2, including, for instance, the inclusion of aluminum in the Cr layer of $NaCrO_2$. The differences in electrochemical characteristics may also be a consequence of differences in grain size. The fade rate of this cell was measured as 5 mAh/g, which is significantly lower than that of Comparative Example 1. The cell also had a significantly lower voltage hysteresis of 150 mV compared to Comparative Example 2.

Example 3

Figure 10:
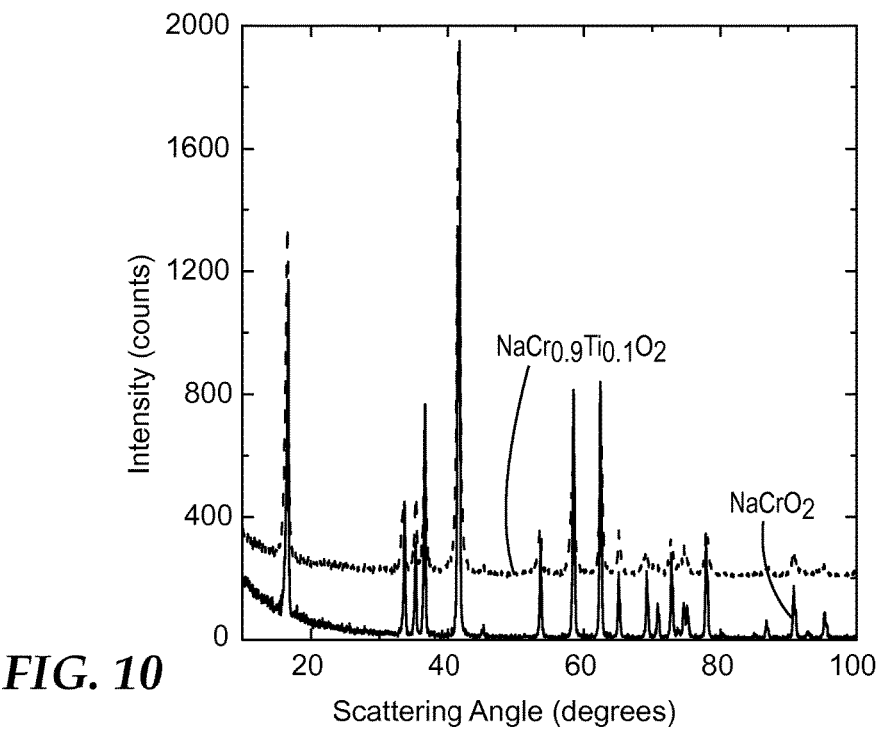
FIG. 10 shows XRD patterns for Comparative Example 1 and Example 3.
Figure 11:
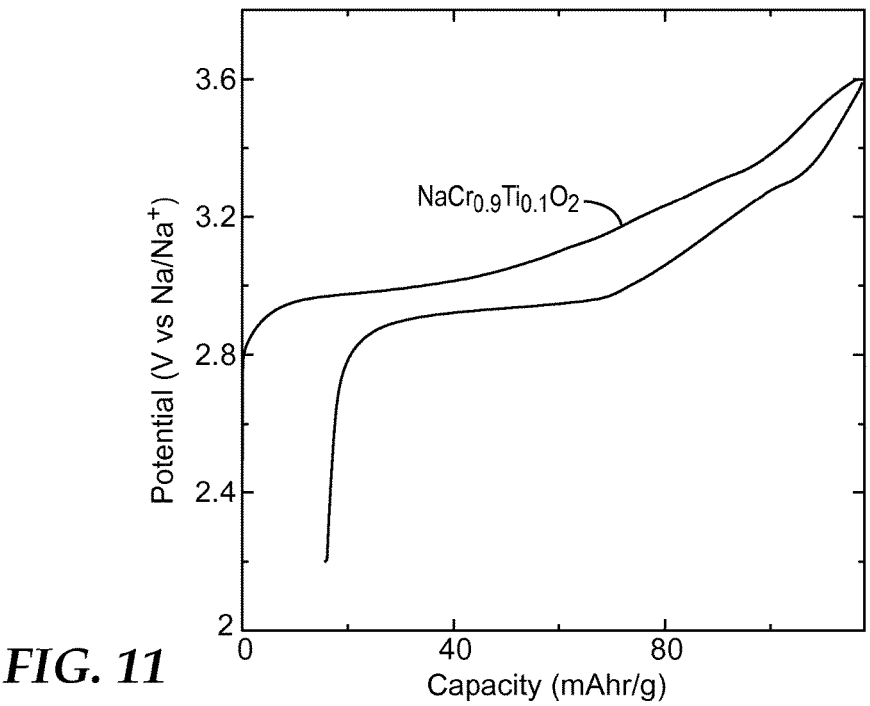
FIG. 11 shows the voltage curve of the cell of Example 3.
Figure 12:
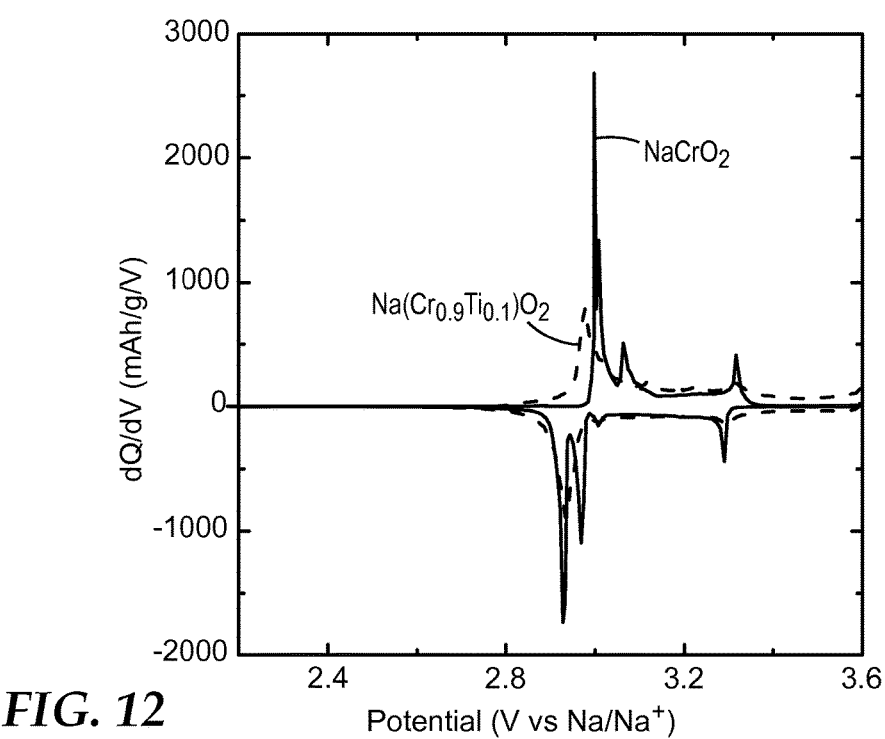
FIG. 12 shows the differential capacity curves of the cells of Comparative Example 1 and of Example 3.

$NaCr_{0.9}Ti_{0.1}O_2$ powder was prepared using $Cr_2O_3$, $TiO_2$ and $Na_2O$ precursor oxides. The XRD pattern of this powder is shown in FIG. 10. Only peaks that are indicative of a crystalline oxide phase with the O3 structure are present in the diffraction pattern. This indicates that the material synthesized is likely a single phase with the chemical formula $NaCr_{0.9}Ti_{0.1}O_2$. The grain size of this phase was determined to be 18.9 nm by XRD. From this powder $NaCr_{0.9}Ti_{0.1}O_2$ vs Na coin cells were constructed. One cell was cycled at a rate of C/10 between 2.2-3.6 V vs Na. The voltage curve for this cell is shown in FIG. 11 and the differential capacity is shown in FIG. 12. There are significant differences between the differential capacity plots of this material and the cells from Comparative Example 1 and Comparative Example 2. The peaks in the differential capacity occur at different voltages and have different peak widths. This may indicate that the material in Example 3 is structurally different than the materials in Comparative Example 1 and Comparative Example 2, including, for instance, the inclusion of titanium in the Cr layer of $NaCrO_2$. It may also be a consequence of differences in grain size. The fade rate of this cell was measured as 5 mh/g, which is significantly lower than that of Comparative Example 1. The cell also had a significantly lower voltage hysteresis of 150 mV compared to Comparative Example 2.

Comparative Example 3

Figure 13:
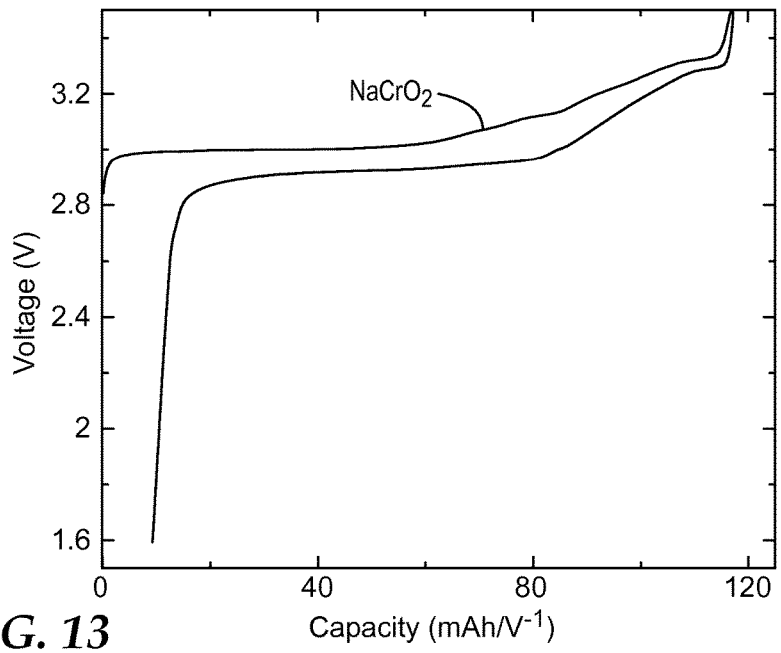
FIG. 13 shows the voltage curve of the cell of Comparative Example 3.
Figure 14:
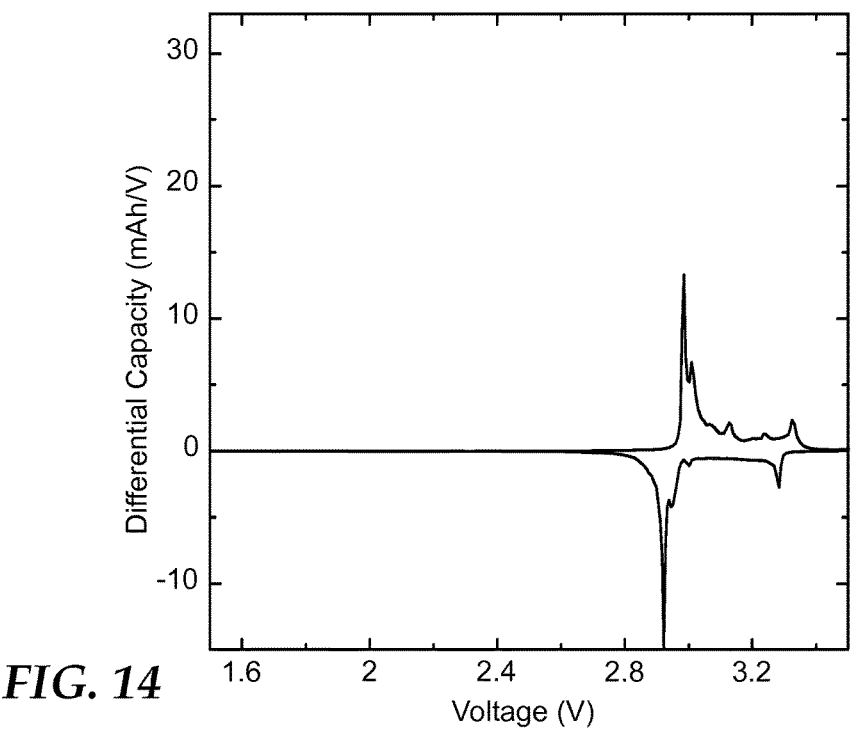
FIG. 14 shows the differential capacity curve of the cell of Comparative Example 3.

$NaCrO_2$ vs Na cells were constructed and cycled as described in Comparative Example 1, excepting that the voltage limits were between 1.6 V and 3.5 V. The voltage curve, differential capacity, and capacity versus cycle number for this cell are plotted in FIGS. 13, 14 and 15, respectively. This cell suffered from significant capacity fade, in a similar manner to the cell of Comparative Example 1.

Example 4

Figure 15:
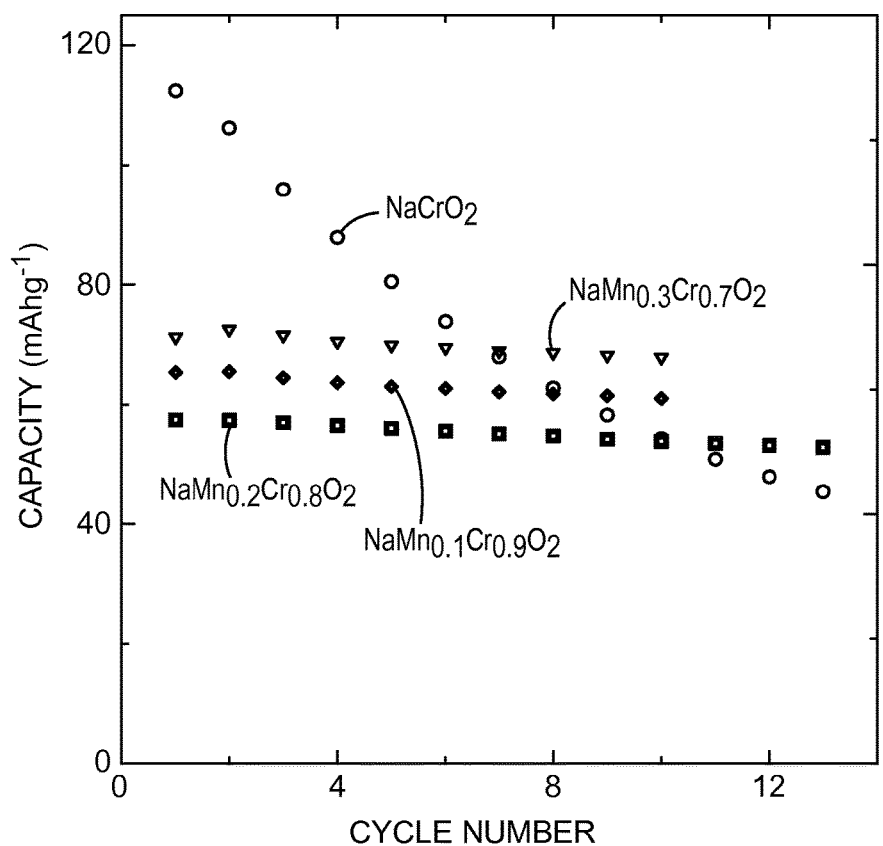
FIG. 15 shows the capacity versus the cycle number of the cells of Comparative Example 3 and of Examples 4-6.
Figure 16:
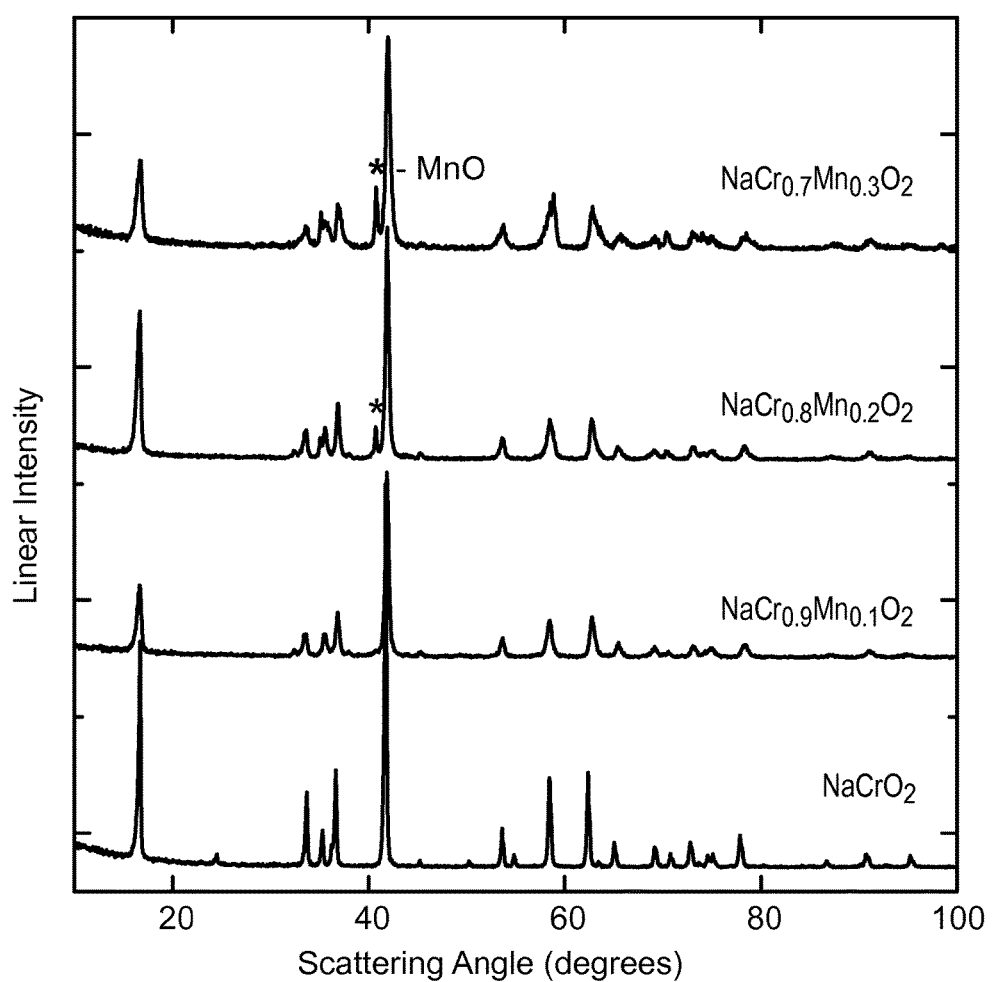
FIG. 16 shows XRD patterns for Comparative Example 3 and Examples 4-6.
Figure 17:
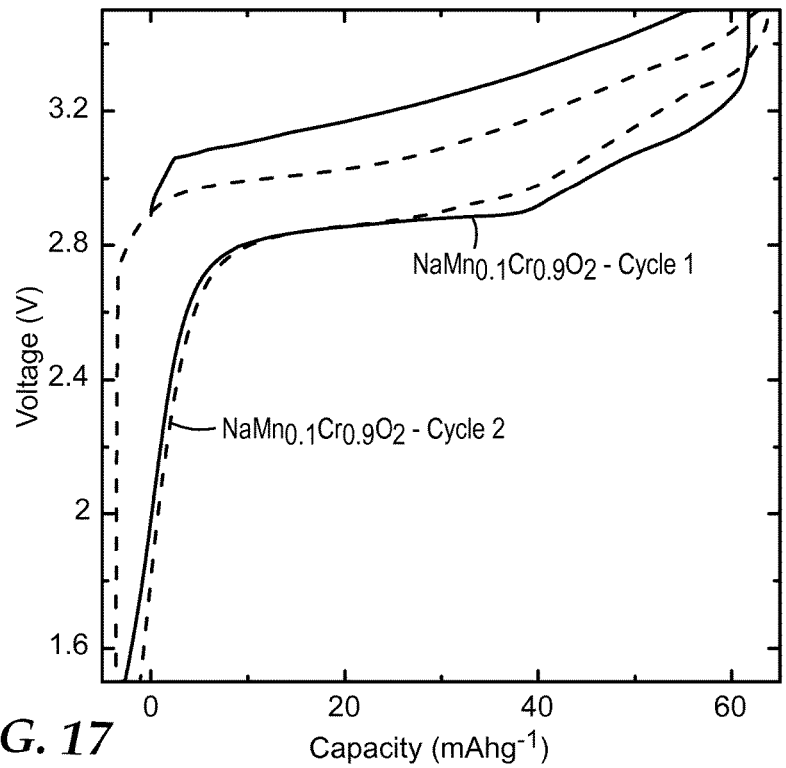
FIG. 17 shows the voltage curve of the cell of Example 4.
Figure 18:
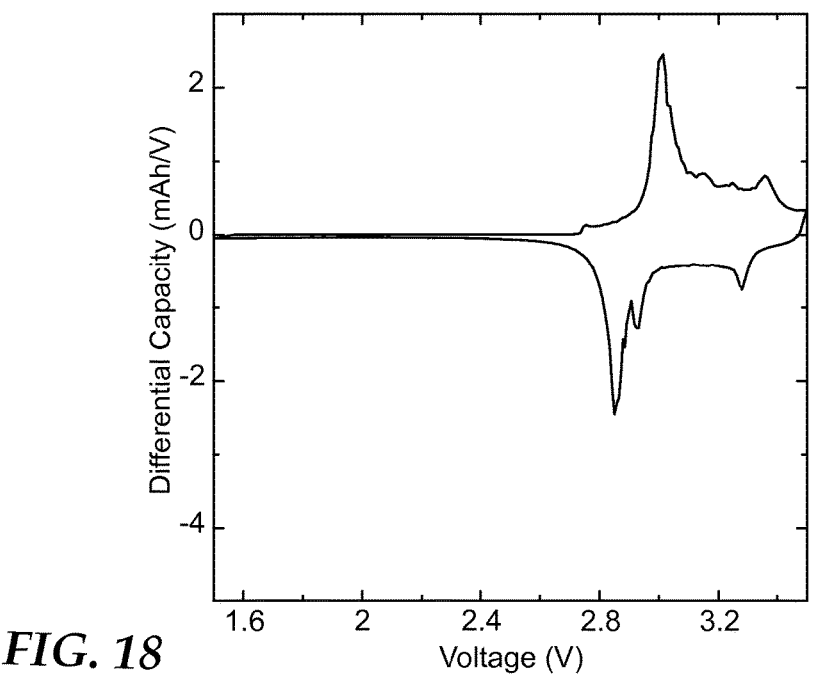
FIG. 18 shows the differential capacity curve of the cell of Example 4.

$NaCr_{0.9}Mn_{0.1}O_2$ powder was prepared using $Cr_2O_3$, $Mn_2O_3$ and $Na_2O$ precursor oxides. The XRD pattern of this powder is shown in FIG. 16. Only peaks that are indicative of a crystalline oxide phase with the O3 structure are present in the diffraction pattern. This indicates that the material synthesized is likely a single phase with the chemical formula $NaCr_{0.9}Mn_{0.1}O_2$. The grain size of this phase was determined to be 22.4 nm by XRD. From this powder $NaCr_{0.9}Mn_{0.1}O_2$ vs Na coin cells were constructed. One cell was cycled at a rate of C/10 between 1.6-3.5 V vs Na. The voltage curve for this cell is shown in FIG. 17 and the differential capacity is shown in FIG. 18. There are significant differences between the differential capacity plots of this material and the cells from Comparative Example 3. The peaks in the differential capacity occur at different voltages and have different peak widths. This may indicate that the material in Example 4 is structurally different than the material in Comparative Example 3, including, for instance, the inclusion of Mn in the Cr layer of $NaCrO_2$. It may also be a consequence of differences in grain size. The capacity versus cycle number for this cell is shown in FIG. 15. The fade rate of this cell was measured as 8 mAh/g, which is significantly lower than that of Comparative Example 3. The cell also had a significantly lower voltage hysteresis of 130 mV compared to Comparative Example 2.

Example 5

Figure 19:
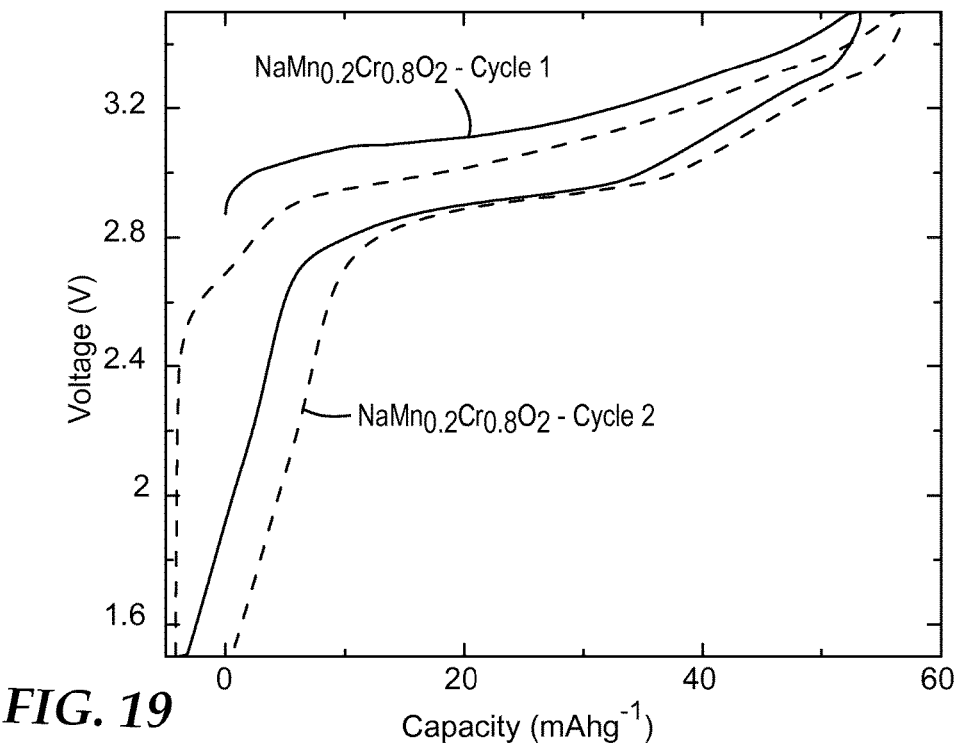
FIG. 19 shows the voltage curve of the cell of Example 5.
Figure 20:
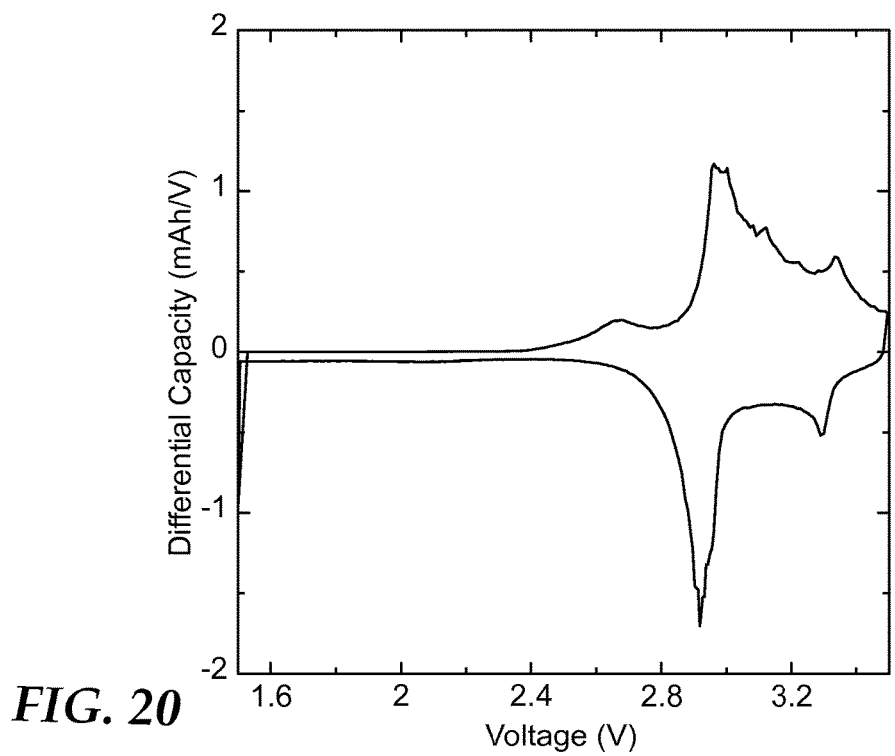
FIG. 20 shows the differential capacity curve of the cell of Example 5.

$NaCr_{0.8}Mn_{0.2}O_2$ powder was prepared using $Cr_2O_3$, $Mn_2O_3$ and $Na_2O$ precursor oxides. The XRD pattern of this powder is shown in FIG. 16. A peak at about 40° in the diffraction pattern is indicative that MnO phase is present in this sample. The other peaks in the diffraction pattern are indicative of a crystalline oxide phase with the O3 structure. This phase may be $NaCrO_2$ or $NaCrO_2$ with some incorporated Mn (e.g. $NaCr_{1-x}Mn_xO_2$). The grain size of this phase was determined to be 21.8 nm by XRD. From this powder $NaCr_{0.8}Mn_{0.2}O_2$ vs Na coin cells were constructed. One cell was cycled at a rate of C/10 between 1.6-3.5 V vs Na. The voltage curve for this cell is shown in FIG. 19 and the differential capacity is shown in FIG. 20. There are significant differences between the differential capacity plots of this material and the cells from Comparative Example 3. The peaks in the differential capacity occur at different voltages and have different peak widths. This may indicate that the material in Example 5 is structurally different than the material in Comparative Example 3, including, for instance, the inclusion of Mn in the Cr layer of $NaCrO_2$. It may also be a consequence of differences in grain size. The capacity versus cycle number for this cell is shown in FIG. 15. The fade rate of this cell was measured as 7 mAh/g, which is significantly lower than that of Comparative Example 3. The cell also had a significantly lower voltage hysteresis of 125 mV compared to Comparative Example 2.

Example 6

Figure 21:
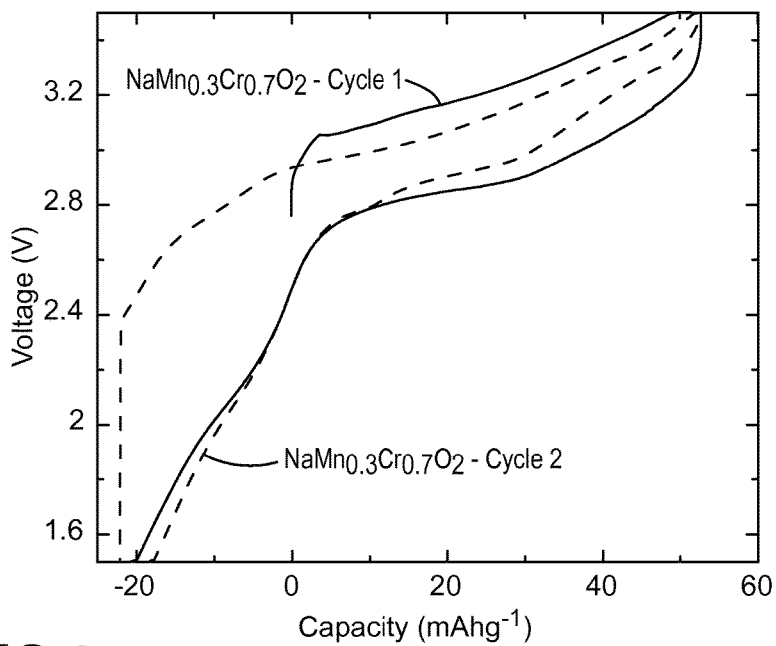
FIG. 21 shows the voltage curve of the cell of Example 6.
Figure 22:
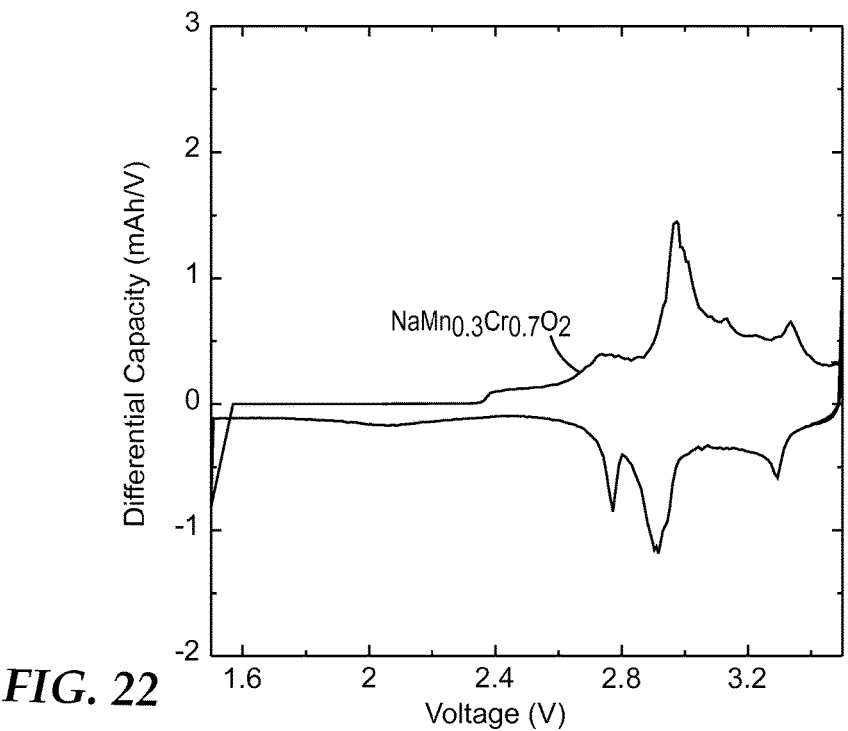
FIG. 22 shows the differential capacity curve of the cell of Example 6.

$NaCr_{0.7}Mn_{0.3}O_2$ powder was prepared using $Cr_2O_3$, $Mn_2O_3$ and $Na_2O$ precursor oxides. The XRD pattern of this powder is shown in FIG. 16. A peak at about 40° in the diffraction pattern is indicative that MnO phase is present in this sample. The other peaks in the diffraction pattern are indicative of a crystalline oxide phase with the O3 structure. This phase may be $NaCrO_2$ or $NaCrO_2$ with some incorporated Mn (e.g. $NaCr_{1-x}Mn_xO_2$). The grain size of this phase was determined to be 16.4 nm by XRD. From this powder $NaCr_{0.7}Mn_{0.3}O_2$ vs Na coin cells were constructed. One cell was cycled at a rate of C/10 between 1.6-3.5 V vs Na. The voltage curve for this cell is shown in FIG. 21 and the differential capacity is shown in FIG. 22. There are significant differences between the differential capacity plots of this material and the cells from Comparative Example 3. The peaks in the differential capacity occur at different voltages and have different peak widths. This may indicate that the material in Example 6 is structurally different than the material in Comparative Example 3, including, for instance, the inclusion of Mn in the Cr layer of $NaCrO_2$. It may also be a consequence of differences in grain size. The capacity versus cycle number for this cell is shown in FIG. 15. The fade rate of this cell was measured as 3 mAh/g, which is significantly lower than that of Comparative Example 3. The cell also had a significantly lower voltage hysteresis of 200 mV compared to Comparative Example 2.

Example 7

Figure 23:
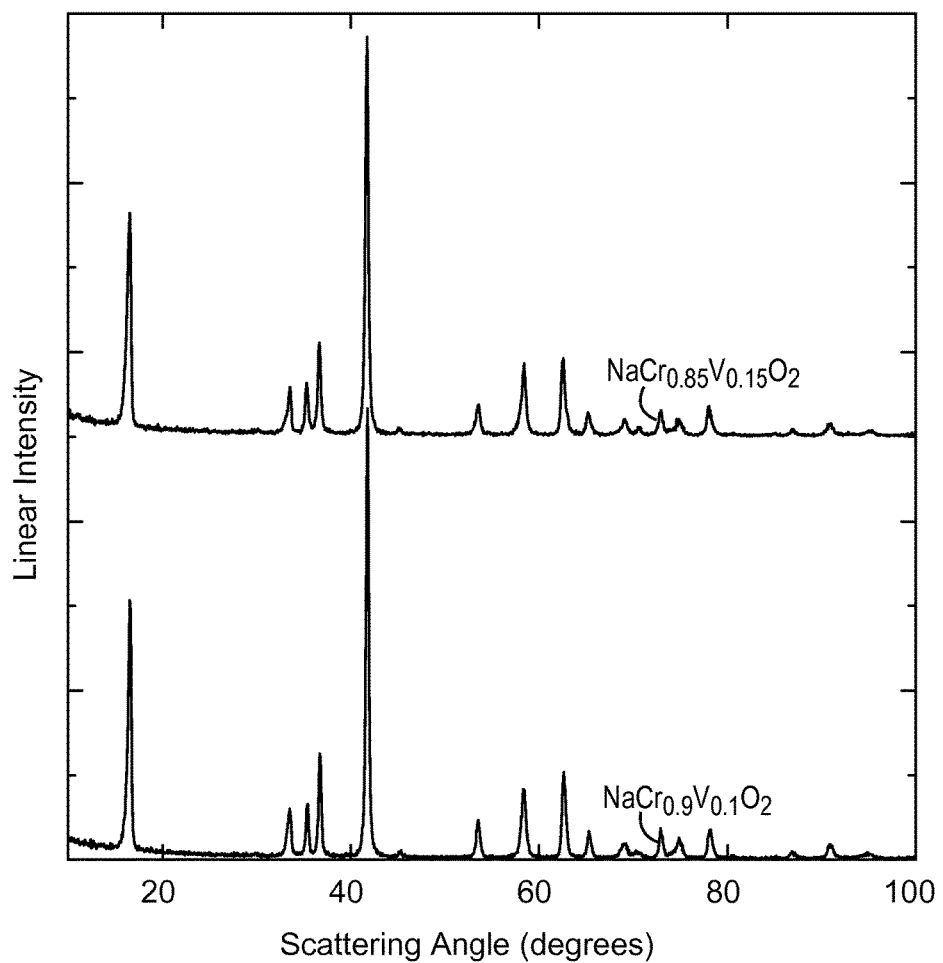
FIG. 23 shows XRD patterns of Examples 7 and 8.
Figure 24:
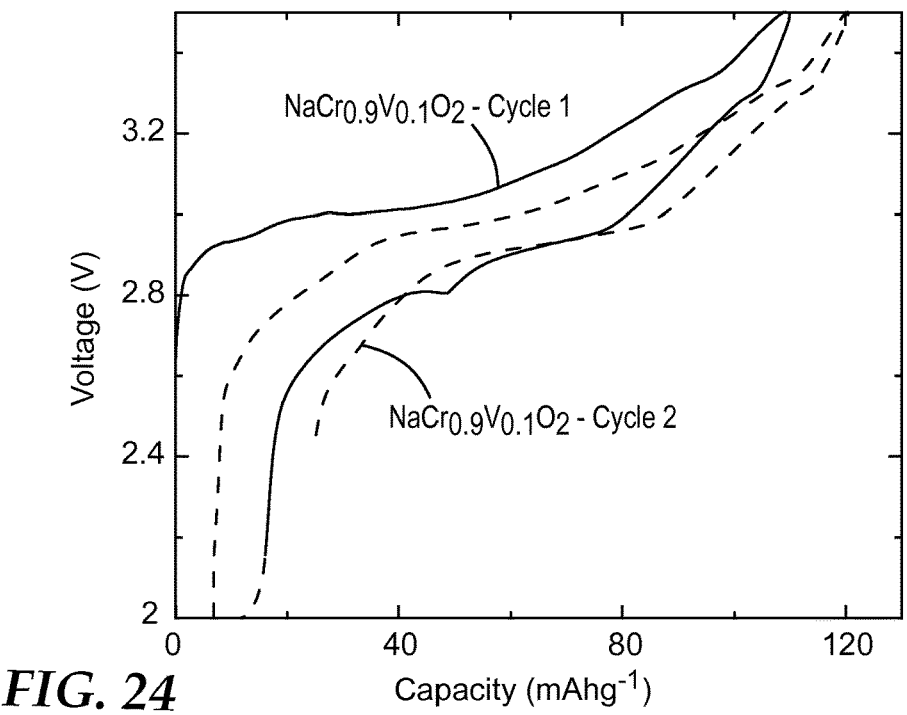
FIG. 24 shows the voltage curve of the cell of Example 7.
Figure 25:
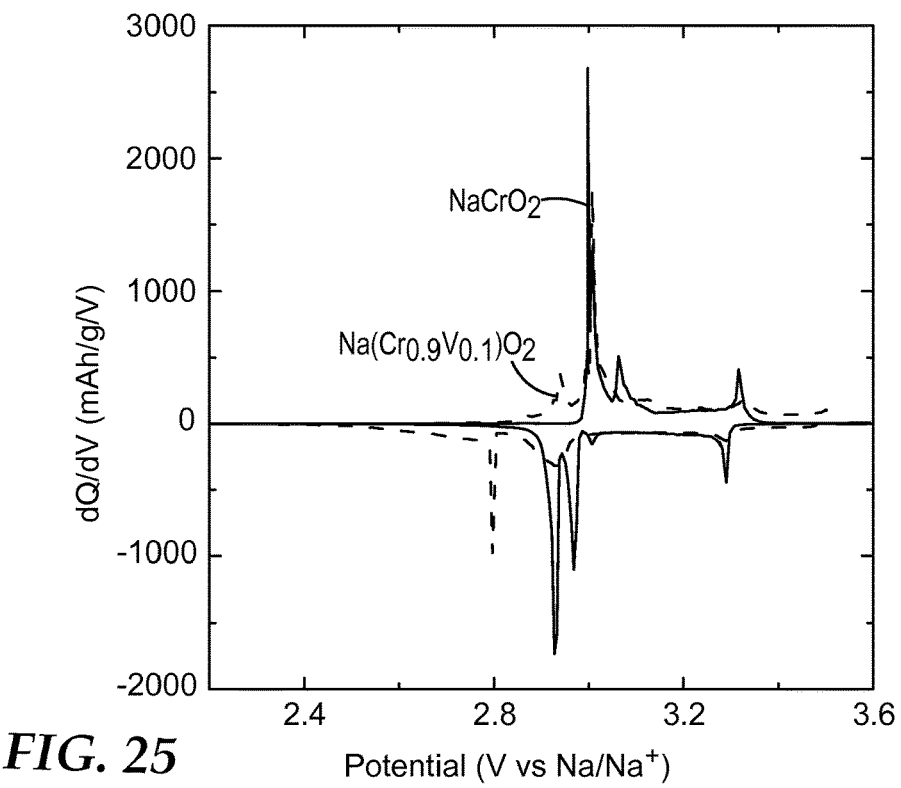
FIG. 25 shows the differential capacity curve of the cells of Comparative Example 1 and of Example 7.
Figure 26:
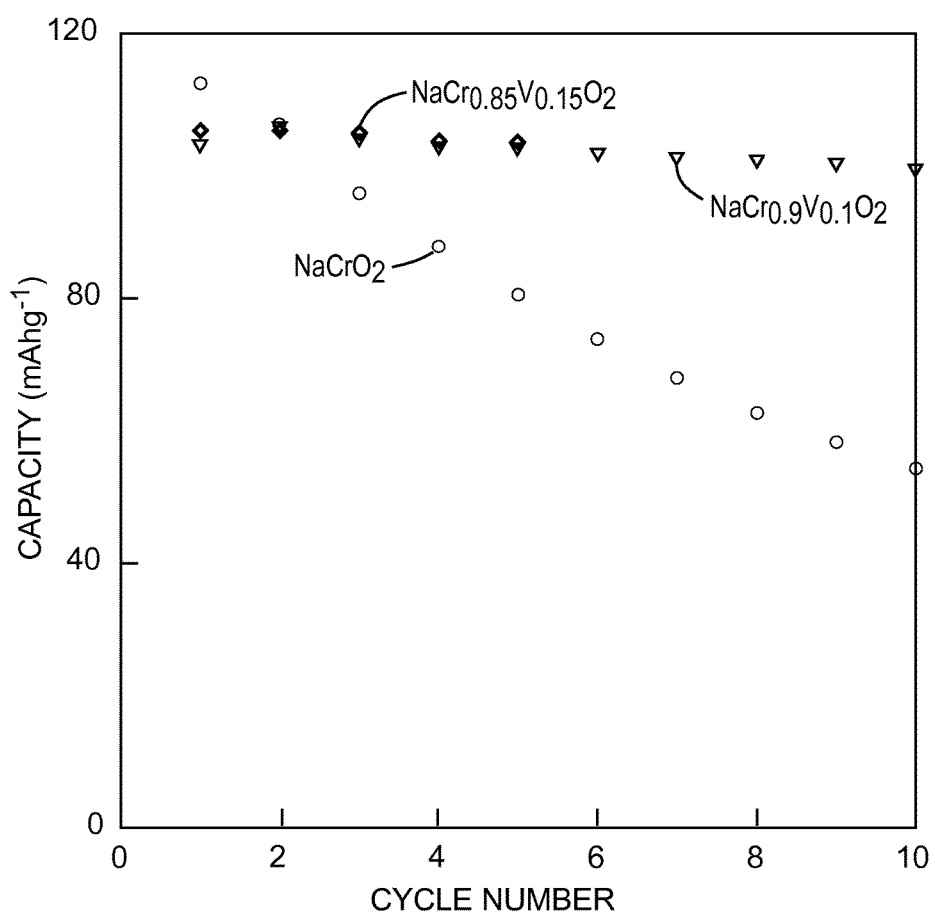
FIG. 26 shows the capacity versus the cycle number of the cell of Example 7.

$NaCr_{0.9}V_{0.1}O_2$ powder was prepared using $Cr_2O_3$, $VO_2$ and $Na_2O$ precursor oxides. The XRD pattern of this powder is shown in FIG. 23. Only peaks that are indicative of a crystalline oxide phase with the O3 structure are present in the diffraction pattern. This indicates that the material synthesized is likely a single phase with the chemical formula $NaCr_{0.9}V_{0.1}O_2$. The grain size of this phase was determined to be 20.8 nm by XRD. From this powder $NaCr_{0.9}V_{0.1}O_2$ vs Na coin cells were constructed. One cell was cycled at a rate of C/10 between 2-3.5 V vs Na. The voltage curve for this cell is shown in FIG. 24 and the differential capacity is shown in FIG. 25. There are significant differences between the differential capacity plots of this material and the cells from Comparative Example 3. The peaks in the differential capacity occur at different voltages and have different peak widths. This may indicate that the material in Example 7 is structurally different than the material in Comparative Example 3, including, for instance, the inclusion of V in the Cr layer of $NaCrO_2$. It may also be a consequence of differences in grain size. The capacity versus cycle number for this cell is shown in FIG. 26. The fade rate of this cell was measured as 2 mAh/g, which is significantly lower than that of Comparative Example 3. The cell also had a significantly lower voltage hysteresis of 135 mV compared to Comparative Example 2.

Example 8

Figure 27:
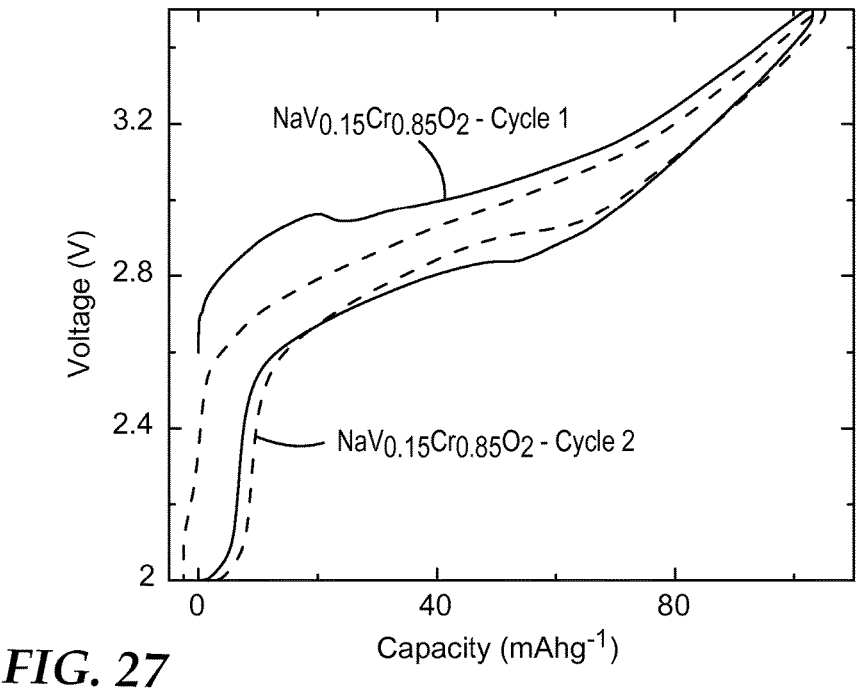
FIG. 27 shows the voltage curve of the cell of Example 8.
Figure 28:
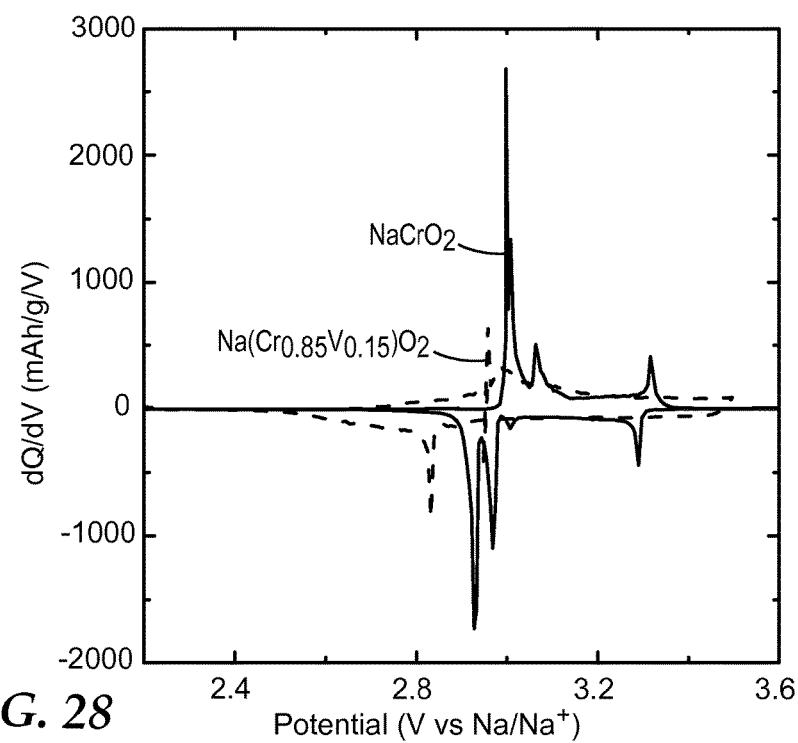
FIG. 28 shows the differential capacity curve of the cells of Comparative Example 1 and of Example 8.

$NaCr_{0.85}V_{0.15}O_2$ powder was prepared using $Cr_2O_3$, $VO_2$ and $Na_2O$ precursor oxides. The XRD pattern of this powder is shown in FIG. 23. Only peaks that are indicative of a crystalline oxide phase with the O3 structure are present in the diffraction pattern. This indicates that the material synthesized is likely a single phase with the chemical formula $NaCr_{0.85}V_{0.15}O_2$. The grain size of this phase was determined to be 24.3 nm by XRD. From this powder $NaCr_{0.85}V_{0.15}O_2$ vs Na coin cells were constructed. One cell was cycled at a rate of C/10 between 2-3.5 V vs Na. The voltage curve for this cell is shown in FIG. 27 and the differential capacity is shown in FIG. 28. There are significant differences between the differential capacity plots of this material and the cells from Comparative Example 3. The peaks in the differential capacity occur at different voltages and have different peak widths. This may indicate that the material in Example 8 is structurally different than the material in Comparative Example 3, including, for instance, the inclusion of V in the Cr layer of $NaCrO_2$. It may also be a consequence of differences in grain size. The capacity versus cycle number for this cell is shown in FIG. 26. The cell had a significantly lower voltage hysteresis of 100 mV compared to Comparative Example 2.

Table 1 below summarizes the results of the Examples and Comparative Examples. Other embodiments of the present disclosure are within the scope of the appended claims.

TABLE 1

| Examples | Composition | Voltage Limits (V) | Cycle10 Discharge Capacity | Fade Rate (mAh/g) | Voltage Hysteresis (mV; $2^{nd}$ cycle) | Grain Size (nm) |
| --- | --- | --- | --- | --- | --- | --- |
| Comparative Example 1 | $NaCrO_2$ | 2.2-3.6 | 65 mAh/g | 51 | 70 | 42.5 |
| Comparative Example 2 | $NaCr_{0.9}Fe_{0.1}O_2$ | 2.2-3.6 | 75 mAh/g | 16 | 500 | 29.3 |
| Example 1 | $NaCr_{0.9}Al_{0.1}O_2$ | 2.2-3.6 | 100 mAh/g | 1 | 150 | 31.5 |
| Example 2 | $NaCr_{0.75}Al_{0.25}O_2$ | 2.2-3.6 | 80 mAh/g | 5 | 150 | 27 |
| Example 3 | $NaCr_{0.9}Ti_{0.1}O_2$ | 2.2-3.6 | 95 mAh/g | 4 | 175 | 18.9 |
| Comparative Example 3 | $NaCrO_2$ | 1.6-3.5 | 47 mAh/g | 47 | 70 | 42.5 |
| Example 4 | $NaCr_{0.9}Mn_{0.1}O_2$ | 1.6-3.5 | 60 mAh/g | 8 | 130 | 22.4 |
| Example 5 | $NaCr_{0.8}Mn_{0.2}O_2$ | 1.6-3.5 | 55 mAh/g | 7 | 125 | 21.8 |

TABLE 1-continued

| Examples | Composition | Voltage Limits (V) | Cycle10 Discharge Capacity | Fade Rate (mAh/g) | Voltage Hysteresis (mV; 2$^{nd}$ cycle) | Grain Size (nm) |
|---|---|---|---|---|---|---|
| Example 6 | NaCr$_{0.7}$Mn$_{0.3}$O$_2$ | 1.6-3.5 | 65 mAh/g | 3 | 200 | 16.4 |
| Example 7 | NaCr$_{0.9}$V$_{0.1}$O$_2$ | 2-3.5 | 100 mAh/g | 2 | 135 | 20.8 |
| Example 8 | NaCr$_{0.85}$V$_{0.15}$O$_2$ | 2-3.5 | 105 mAh/g (cycle 6) | N/A | 100 | 24.3 |

What is claimed is:

1. A cathode composition for a sodium-ion battery, the composition having the formula:

$$NaCr_{1-x}M_xO_2,$$

wherein M is one or more metal elements;
wherein x is greater than 0 and less than or equal to 0.5;
wherein the cathode composition comprises an O3 phase having a grain size that is less than 42.5 nanometers, and a secondary phase consisting of a metal oxide or a sodium transition metal oxide.

2. The cathode composition of claim 1, wherein x is less than or equal to 0.25.

3. The cathode composition of any one of claims 1-2, wherein M comprises aluminum, a transition metal, or combinations thereof.

4. The cathode composition of any one of claims 1-3, wherein M comprises aluminum, titanium, vanadium, chromium, manganese, cobalt, nickel, copper, zirconium, niobium, molybdenum, tungsten or combinations thereof.

5. The cathode composition of any one of claims 1-4, wherein M comprises aluminum, vanadium, manganese, titanium, or combinations thereof.

6. A sodium-ion electrochemical cell comprising:
the cathode composition of claim 1;
an anode; and
an electrolyte.

7. An electronic device comprising an electrochemical cell according to claim 6.

8. A method of making a cathode composition comprising:
combining precursors of a composition having the formula:

$$NaCr_{1-x}M_xO_2; \text{ and}$$

heating the precursors to form the composition;
wherein M is one or more metal elements;
wherein x is greater than 0 and less than or equal to 0.5; and
wherein the cathode composition comprises an O3 phase having a grain size that is less than 42.5 nanometers, and a secondary phase consisting of a metal oxide or a sodium transition metal oxide.

9. The method according to claim 8, wherein the step of combining the precursors comprises mechanically milling the precursors.

* * * * *